US008559040B2

(12) United States Patent
Gross et al.

(10) Patent No.: US 8,559,040 B2
(45) Date of Patent: Oct. 15, 2013

(54) METHOD AND SYSTEM FOR PERFORMING STATISTICAL THROUGHPUT CONTROL IN A PRINT SHOP

(75) Inventors: Eric Michael Gross, Rochester, NY (US); Sharath Srinivas, Webster, NY (US); Sudhendu Rai, Fairport, NY (US); Jack Gaynor Elliot, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 248 days.

(21) Appl. No.: 13/229,232

(22) Filed: Sep. 9, 2011

(65) Prior Publication Data
US 2013/0063764 A1 Mar. 14, 2013

(51) Int. Cl.
*G06F 3/12* (2006.01)
*H04N 1/60* (2006.01)

(52) U.S. Cl.
USPC ........................................ 358/1.15; 358/1.13

(58) Field of Classification Search
USPC ............... 358/1.1, 1.9, 1.13, 1.14, 1.15, 1.18, 358/402; 700/94, 97, 100; 702/179; 705/1.12, 1.13, 7.39, 26.35; 708/202, 708/207, 403
See application file for complete search history.

(56) References Cited

U.S. PATENT DOCUMENTS

| 8,107,106 B2 * | 1/2012 | Rai ............................... 358/1.15 |
| 2008/0082181 A1 * | 4/2008 | Miller et al. .................... 700/30 |
| 2008/0137914 A1 | 6/2008 | Minhas |
| 2009/0094094 A1 * | 4/2009 | Rai et al. ......................... 705/10 |
| 2010/0241399 A1 * | 9/2010 | Kavaklioglu ................. 702/179 |
| 2010/0280630 A1 * | 11/2010 | Worek et al. ..................... 700/15 |

OTHER PUBLICATIONS

Hopp et al., "Factory Physics Foundations of Manufacturing Management," 2001, pp. 448-452, Irwin McGraw-Hill, Boston, MA USA.

* cited by examiner

*Primary Examiner* — Gabriel Garcia
(74) *Attorney, Agent, or Firm* — Fox Rothschild LLP

(57) ABSTRACT

A method of determining a probability of a set of print jobs being completed within a time period may include receiving a schedule associated with a set of print jobs. The schedule may include a sequence in which the set of print jobs is to be processed, a mean processing time associated with each print job in the set, and a standard deviation of a processing time associated with each print job in the set. The method may include determining a probability that a print shop will complete processing of the set of print jobs within a time period based on the mean processing time and standard deviation associated with each of the print jobs in the set that has not been processed and displaying the probability on a display device.

21 Claims, 7 Drawing Sheets

METHOD AND SYSTEM FOR PERFORMING STATISTICAL THROUGHPUT CONTROL IN A PRINT SHOP

BACKGROUND

Statistical throughput control (STC) can be used to provide production facility personnel with an indication as to whether the production facility is likely to meet scheduled commitments, such as whether production quota will be met. Typically, production is guided by a schedule so that a tracking error can be determined with respect to how far ahead or behind of schedule production is. STC computes the probability of achieving quota given the current state of production. If the probability is low, preemptive actions, such as scheduling overtime, resource reallocation or renegotiation of commitments can be performed.

However, STC only considers a simplified model of production in which each item that is produced is assumed to have the same mean production time and variance. In print production environments, the situation is different in that production time and variance are a function of the job size. It is not suitable to use STC in such situations as these in which STC's basic tenants are contradicted.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of determining a probability of a set of print jobs being completed within a time period may include receiving a schedule associated with a set of print jobs. The schedule may include a sequence in which the set of print jobs is to be processed, a mean processing time associated with each print job in the set, and a standard deviation of a processing time associated with each print job in the set. The method may include determining a probability that a print shop will complete processing of the set of print jobs within a time period based on the mean processing time and standard deviation associated with each of the print jobs in the set that has not been processed and displaying the probability on a display device.

In an embodiment, a method of determining a probability of a set of print jobs being completed within a shift period may include receiving a schedule associated with a set of print jobs. The schedule may include a sequence in which the set of print jobs is to be processed, a mean processing time associated with each print job in the set, and a standard deviation of a processing time associated with each print job in the set. The method may include determining, by a computing device, a first probability that a print shop will complete processing the set of print jobs within a time period if the print shop is a first number of print jobs behind schedule at a start time of the print job, determining, by the computing device, a second probability that the print shop will complete processing the set of print jobs within the time period if the print shop is a second number of print jobs ahead of schedule at the start time of the print job, determining, by the computing device, a third probability that the print shop will complete processing the set of print jobs within the time period if the print shop is on schedule at the start time of the print job, and displaying the first, second and third probabilities associated with each of the one or more print jobs on a display device.

In an embodiment, a system of determining a probability of a set of print jobs being completed within a time period may include a computing device and a computer readable storage medium in communication with the computing device. The computer-readable storage medium may include one or more programming instructions for receiving a schedule associated with a set of print jobs. The schedule may include a sequence in which the set of print jobs is to be processed, a mean processing time associated with each print job in the set, and a standard deviation of a processing time associated with each print job in the set. The computer-readable storage medium may include one or more programming instructions for determining a probability that a print shop will complete processing of the set of print jobs within a time period based on the mean processing time and standard deviation associated with each of the print jobs in the set that has not been processed, and causing the probability to be displayed on a display device.

DETAILED DESCRIPTION

The following terms shall have, for the purposes of this application, the respective meanings set forth below.

A "print device" refers to a device capable of performing one or more print job functions on a print job. A print device may include a printer, a cutter, a collator, a scanner, a fax machine, a multi-function device or other similar equipment.

A "job" refers to a logical unit of work that is to be completed for a customer. In a print environment, a job may include one or more print jobs from one or more clients.

A "print job" refers to a job that can be processed by a print shop. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "print job function" is a function, operation and/or service, such as printing, binding, collating and/or the like, that is performed on a print job.

A "print shop" refers to an entity that includes a plurality of print devices, such as printers, cutters, collators and the like. A print shop may be a free-standing entity, including one or more print devices, or it may be part of a corporation or other entity. Additionally, a print shop may communicate with one or more servers by way of a communications network, such as the Internet, an intranet, a LAN, a WAN, a wireless network and/or the like.

"Processing" of a print job means performing one or more print job functions on a print job to transform a print job in some manner and/or result in the display, transmission or conversion of the print job to a physical substrate.

"Print job type" is a combination of print job functions that are performed to complete a print job. Exemplary print job types may include book, magazine, envelopes and/or the like.

"Production time" means the amount of time between submission of a job and completion of the job.

Figure 1:
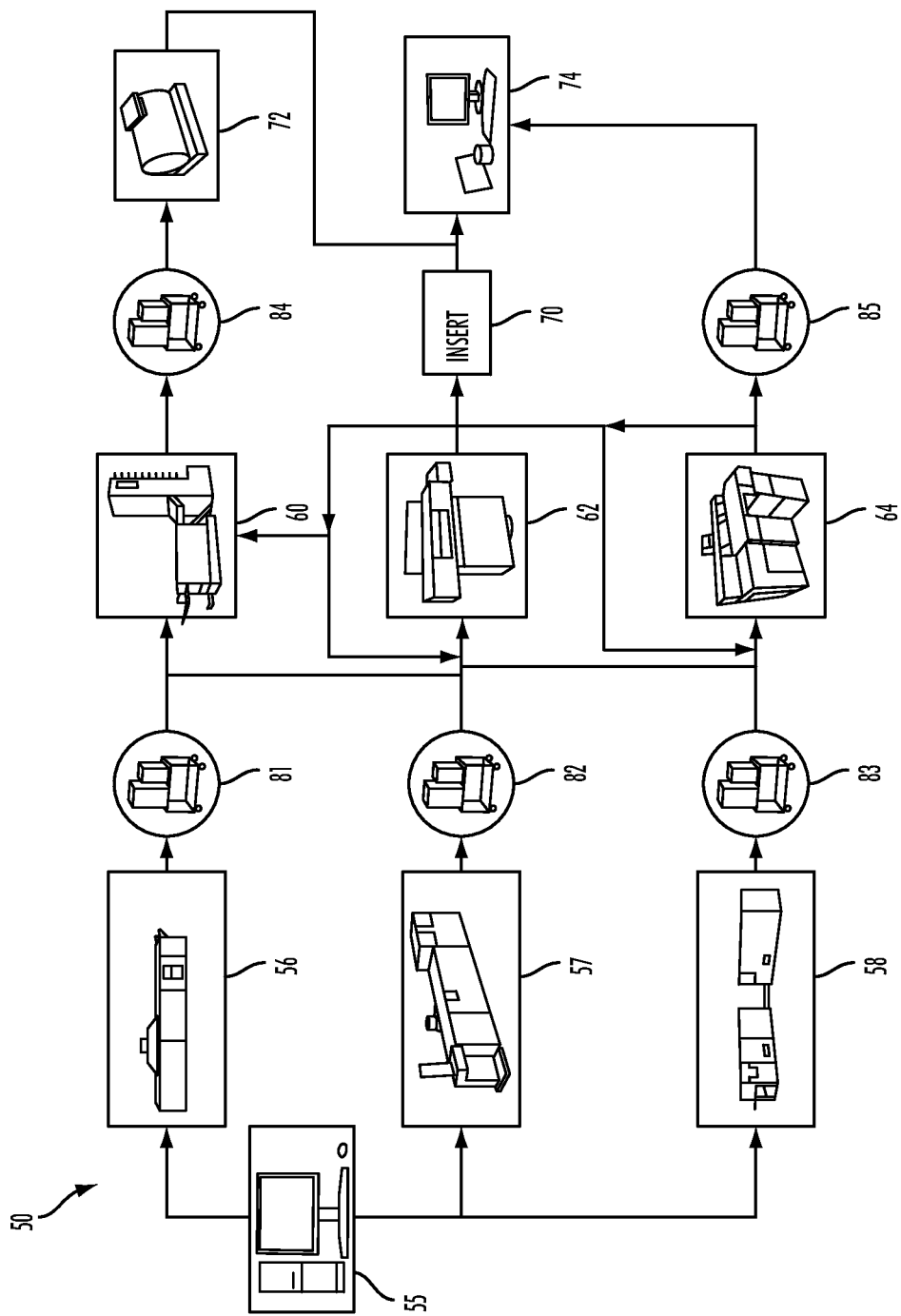
FIG. 1 illustrates an exemplary production environment according to an embodiment.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85. Although the disclosed embodiments pertain to document production systems, the disclosed methods and systems can be applied to production systems in general.

In an embodiment, a print shop may receive a set of print jobs to complete within a certain shift or period of time. The print jobs in the set may have different print job sizes. In a print shop environment, the production time associated with a print job may depend at least in part on the print job size, the print job type and/or the like. For example, the production time associated with a 1,000 page print job may be greater than the production time associated with a 100 page print job of the same print job type. Similarly, the production time associated with a book print job type may be greater than the production time associated with an envelope print job type of an equivalent size.

In an embodiment, a set of print jobs may be associated with a schedule that estimates when each print job should be started, a mean processing time for each print job, a standard deviation of the processing time for each print job, a variance in the mean processing time for each print job and/or the like. In an embodiment, the mean processing times and variances associated with a set of print jobs may not necessarily be the same. In other words, not every print job in a print job set will have the same mean processing time and/or variance.

In an embodiment, the schedule may serve as a guideline of how and when print jobs should be processed. For example, a schedule may identify a sequence in which a set of print jobs is to be processed. However, unanticipated occurrences, such as a device failure, malfunction and/or the like, may delay or otherwise change the actual timing of jobs.

Figure 2:
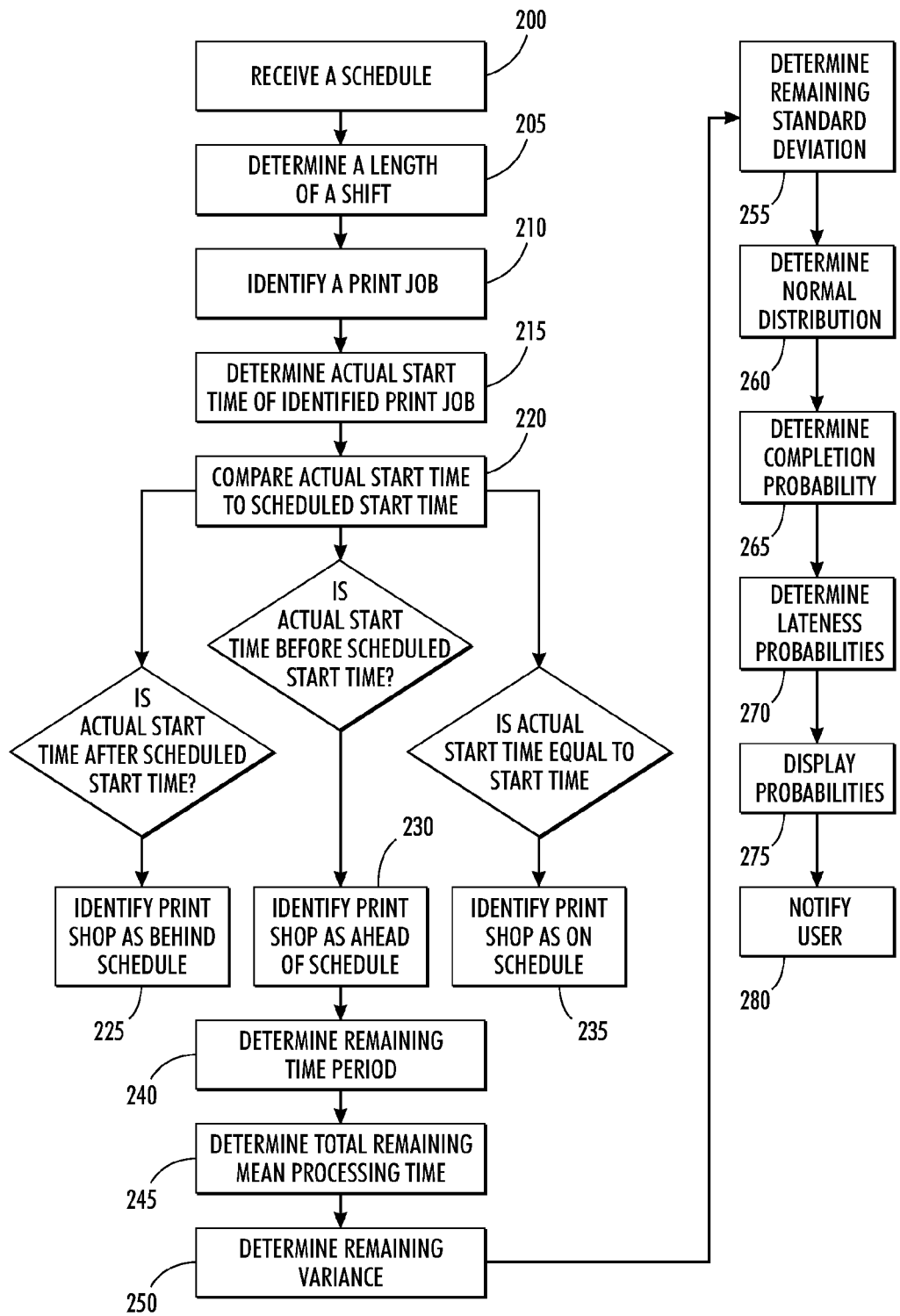
FIG. 2 illustrates an exemplary method of estimating a probability of completion for a job set according to an embodiment.

FIG. 2 illustrates an exemplary method of estimating a probability of completion for a job set according to an embodiment. As illustrated by FIG. 2, a schedule associated with a set of print jobs may be received 200. The schedule may include a mean processing time, a standard deviation and/or a variance for each print job in the set. Table 1 illustrates an exemplary schedule according to an embodiment. As illustrated by Table 1, the set of print jobs may be processed in a sequence that starts with Print Job 1 and ends with Print Job 5. In an embodiment, a schedule may include scheduled start times associated with each print job as illustrated in Table 1.

TABLE 1

| Print Job | Start Time (seconds) | Mean Processing Time (seconds) | Variance in Processing Time |
|---|---|---|---|
| 1 | 0 | 9,074 | 3,293,499 |
| 2 | 9,074 | 9,529 | 3,632,074 |
| 3 | 18,603 | 5,635 | 1,270,129 |
| 4 | 24,238 | 9,567 | 3,661,100 |
| 5 | 33,805 | 8,162 | 2,664,730 |
| Print Jobs 1-5 | | 41,967 | 1,4521,532 |

In an embodiment, the scheduled start times may be within a period of time, before the expiration of a period of time and/or the like. For example, if the set of five print jobs illustrated in Table 1 are to be completed within a fourteen hour time period, the start time of Print Job 1 may be "0" and the start time of Print Job 5 may be some time before the end of the fourteen hour time period.

In an embodiment, the start time of the last print job in the set may be such that there is sufficient time to complete processing of the last job within the period of time. For example, referring to Table 1, the start time of Print Job 5 may allow for Print Job 5 to be completed within the fourteen hour time period.

In an embodiment, the length of a time period may be determined 205. In an embodiment, a length of a time period to complete a schedule may be determined 205. In an embodiment the length of a time period may be determined 205 by summing the mean processing times associated with each print job in a set. For example, referring to Table 1, a time period may be 41967 seconds, or approximately 12 hours. In an embodiment, a time period may be determined by summing the mean processing times associated with each print job in a set and adding a certain number of standard deviations. In an embodiment, a number of standard deviations may have an integer value. In an alternate embodiment, a number of standard deviations may have a non-integer value. In an embodiment, a standard deviation for the set of print jobs may be determined by summing the variances associated with each print job and determining the square root of the sum. For example, referring to Table 1, a standard deviation associated with the time to complete Print Jobs 1-5 may be determined by the following:

$$\sqrt{3{,}293{,}499 + 3{,}632{,}074 + 1{,}270{,}129 + 3{,}661{,}100 + 2{,}664{,}730} = 3{,}810.71$$

In an embodiment, the length of a time period may be determined 205 by adding one or more standard deviations to the sum of the mean processing times for a set of print jobs. For example, if the set of print jobs illustrated in Table 1 is to be processed within two standard deviations, the time period may be approximately fourteen hours (i.e., 41,967 seconds+ (3,810.71*2)=49,588.42 seconds).

In an embodiment, the adherence of a set of print jobs to a corresponding schedule may be determined. An adherence may be a measure of how well a print shop adheres to a schedule in processing one or more print jobs during a time period. In an embodiment, the adherence of a set of print jobs to a corresponding schedule may be determined after completion of one or more print jobs in the set. For example, the adherence of a set of print jobs to a schedule may be determined after each print job is completed, after every other print job is completed, after half of the print jobs are completed and/or the like.

In an embodiment, a print job in the set of jobs may be identified 210. The adherence of the set of print jobs to the schedule may be determined based on the print jobs in the set that were processed prior to the identified print job. For example, referring to Table 1, if Print Job 3 is identified, the adherence of the set of print jobs to the schedule may be determined based on the processing of Print Job 1 and Print Job 2.

In an embodiment, an actual start time associated with the identified print job may be determined 215. The actual start time may be the time at which the print shop begins processing the identified print job. In an embodiment, the actual start time may be compared 220 with the scheduled start time associated with the identified print job from the schedule. Based on this comparison, the print shop may be identified as on schedule, ahead of schedule or behind schedule.

In an embodiment, if the actual start time is equal to or is within a range of the scheduled start time, the identified print job may be identified 235 as on schedule. For example, a print shop may be identified 235 as on schedule if its actual start time is within 120 seconds of its scheduled start time. If the scheduled start time for Print Job 3 is 18,603 seconds into production, and the actual start time for Print Job 3 is within the range of 18,483-18,723 seconds, the print shop may be identified 235 as on schedule.

In an embodiment, if the actual start time is after than the scheduled start time of the scheduled start time associated with an identified print job, the print shop may be identified 225 as behind schedule. For example, referring to Table 1, if the actual start time of Print Job 3 is 30,000 seconds, the print shop may be identified 225 as behind schedule. In an embodiment, if the actual start time occurs after a certain period of time from the scheduled start time associated with an identified print job, the print shop may be identified 225 as behind schedule. For example, a print shop may be identified 225 as behind schedule if its actual start time occurs after 120 seconds from its scheduled start time.

In an embodiment, a print shop may be identified 225 as a certain number of print jobs behind schedule. The actual start time associated with a print job may be compared to the scheduled start times for the set of print jobs to determine how many print jobs behind schedule the print shop is. For example, if the actual start time of Print Job 3 is 30,000 seconds, the schedule may be analyzed to determine what print job the print shop was scheduled to be processing at this time. As illustrated by Table 1, the print shop was scheduled to be processing Print Job 4 at 30,000 seconds. As such, the print shop may be identified 225 as one print job behind schedule.

In an embodiment, if the actual start time is before the scheduled start time associated with an identified print job, the print shop may be identified 230 as ahead of schedule. For example, referring to Table 1, if the actual start time of Print Job 3 is 18,000 seconds, the print shop may be identified 230 as ahead of schedule. In an embodiment, if the actual start time occurs before a certain period of time prior to the scheduled start time associated with an identified print job, the print shop may be identified 230 as ahead of schedule. For example, a print shop may be identified 230 as ahead of schedule if its actual start time occurs before 120 seconds prior to its scheduled start time.

In an embodiment, a print shop may be identified 230 as a certain number of print jobs ahead of schedule. The actual start time associated with a print job may be compared to the scheduled start times for the set of print jobs to determine how many print jobs ahead of schedule the print shop is. For example, if the actual start time of Print Job 3 is 18,000 seconds, the schedule may be analyzed to determine what print job the print shop was scheduled to be processing at this time. As illustrated by Table 1, the print shop was scheduled to process Print Job 2 at 18,000 seconds. As such, Print Job 3 may be identified 230 as one print job ahead of schedule.

In an embodiment, a remaining amount of time in a time period may be determined 240. A remaining amount of time may be determined by the difference between the length of the time period and the actual start time of the identified print job. For example, referring to Table 1, if the time period is equal to 49,587 seconds and the actual start time of Print Job 3 is 30,000 seconds, the remaining amount of time may be equal to 19,587 seconds (i.e., 49,587−30,000). As another example, if the time period is equal to 49,587 seconds and the actual start time of Print Job 3 is 18,000 seconds, the remaining amount of time may be equal to 31,587 seconds.

In an embodiment, a total remaining mean processing time may be determined 245. A total remaining mean processing time may be a sum of the processing times associated with each print job that has not yet been processed. For example, referring to Table 1, a total remaining mean processing time for Print Jobs 3, 4 and 5 may be determined 245 by summing the mean processing times associated with each of Print Job 3, Print Job 4 and Print Job 5 (i.e., 5,635+9,567+8,162=23,364).

In an embodiment, a remaining variance may be determined 250. A remaining variance may be the sum of the variances associated with each of the remaining print jobs. For example, referring to Table 1, a remaining variance associated with Print Jobs 3, 4 and 5 may be determined 250 by summing the variances associated with each of Print Job 3, Print Job 4 (i.e., 1,270,129+3,661,100+2,664,730=7,595,959).

In an embodiment, a remaining standard deviation may be determined 255. A remaining standard deviation may be the square root of the remaining variance. For example, referring to Table 1, a remaining standard deviation associated with Print Jobs 3, 4 and 5 may be determined 255 by taking the square root of the remaining variance (i.e., $$(\text{i.e., } \sqrt{7595959} = 2{,}756.07).$$

Figure 3:
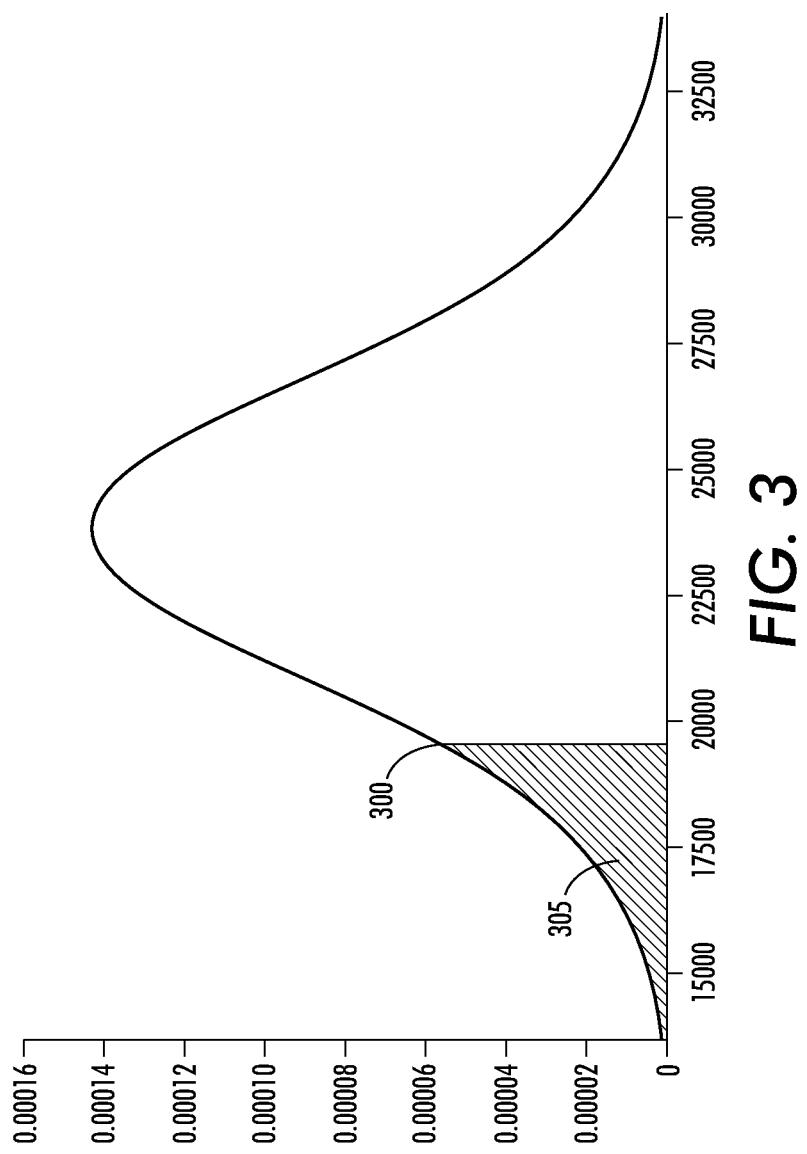
FIGS. 3-5 illustrate a normal distribution according to an embodiment.

In an embodiment, a normal distribution may be determined 260. A normal distribution may be a continuous probability distribution represented by the following:

$$f(x) = \frac{1}{\sqrt{2\pi\sigma^2}} e^{-\left(\frac{(x-\mu)^2}{2\sigma^2}\right)},$$

where $\mu$ is the mean, $\sigma$ is the standard deviation, and $\sigma^2$ is the variance In an embodiment, a normal distribution having a mean equal to the total remaining mean processing time and a standard deviation equal to the remaining standard deviation may be determined 260. For instance, in the above example, a normal distribution having a mean of 23,364 seconds and a standard deviation of 2,756.07 seconds may be determined 260. FIG. 3 illustrates an exemplary normal distribution having a mean of 23,364 seconds and a standard deviation of 2,756.07 seconds according to an embodiment.

In an embodiment, a completion probability may be determined 265. A completion probability may be the probability that the print shop will complete processing of the print job set within the time period. In an embodiment, a completion probability may be determined 265 by determining a ratio of the area under the normal distribution below a value equal to the remaining amount of time to the total area under the normal distribution. For example, referring to FIG. 3, if the print shop is behind schedule, and the actual start time of Print Job 3 is 30,000 seconds, the remaining amount of time 300 is equal to 19,587 seconds. The completion probability may be the area 305 under the curve below 19,587 seconds. In an embodiment, this area 305 may be equal to 0.085. The total area under the normal distribution may be equal to 1, so the ratio may be $$\frac{0.085}{1}.$$

In an embodiment, this may mean that there is a 8.5% probability that the print shop will complete processing Print Jobs 1-5 before the end of the time period if Print Job 3 begins 30,000 seconds into processing of the set.

Figure 4:
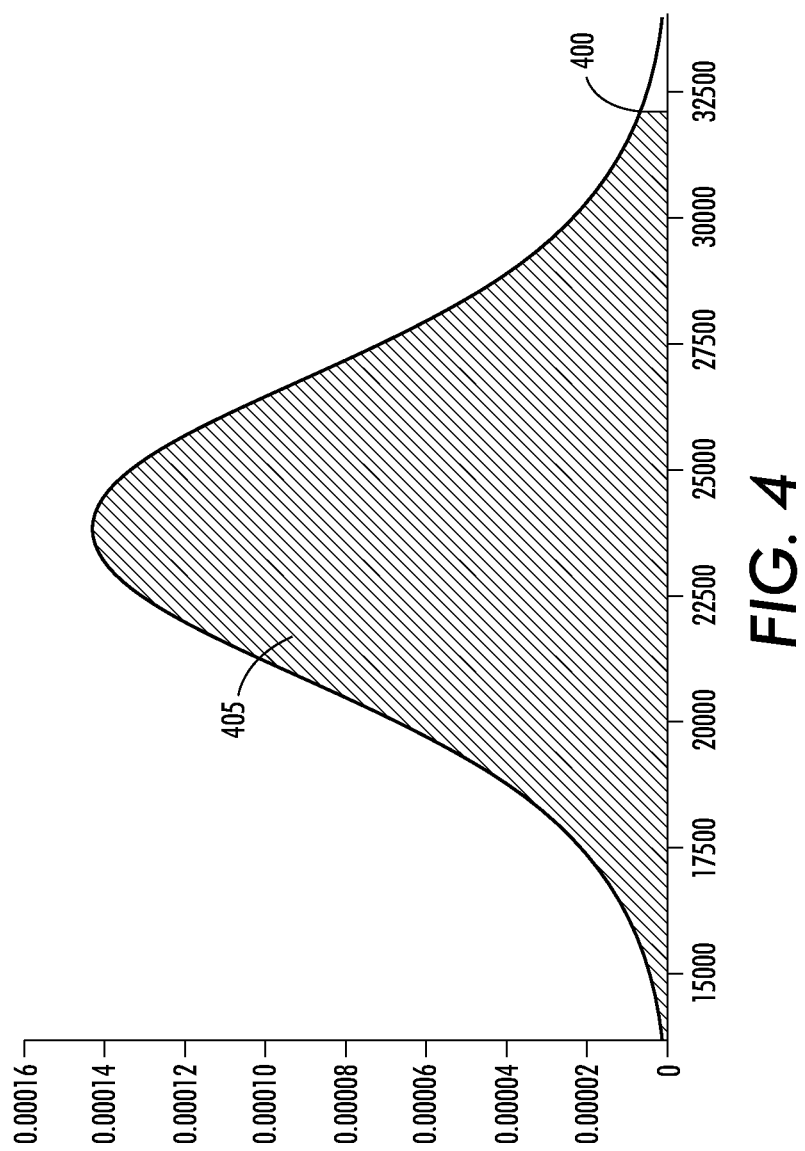

As another example, if the print shop is ahead of schedule, and the actual start time of Print Job 3 is 18,000 seconds, the remaining amount of time 400 is equal to 31,587 seconds. The completion probability may be the area 405 under the curve below 31,587 seconds, as illustrated in FIG. 4. In an embodiment, this area 405 may be equal to 0.9985. The total area under the normal distribution may be equal to 1, so the ratio may be $$\frac{0.9985}{1}.$$

In an embodiment, this may mean that there is a 99.85% probability that the print shop will complete processing Print Jobs 1-5 before the end of the time period if Print Job 3 begins 18,000 seconds into processing of the set.

Figure 5:
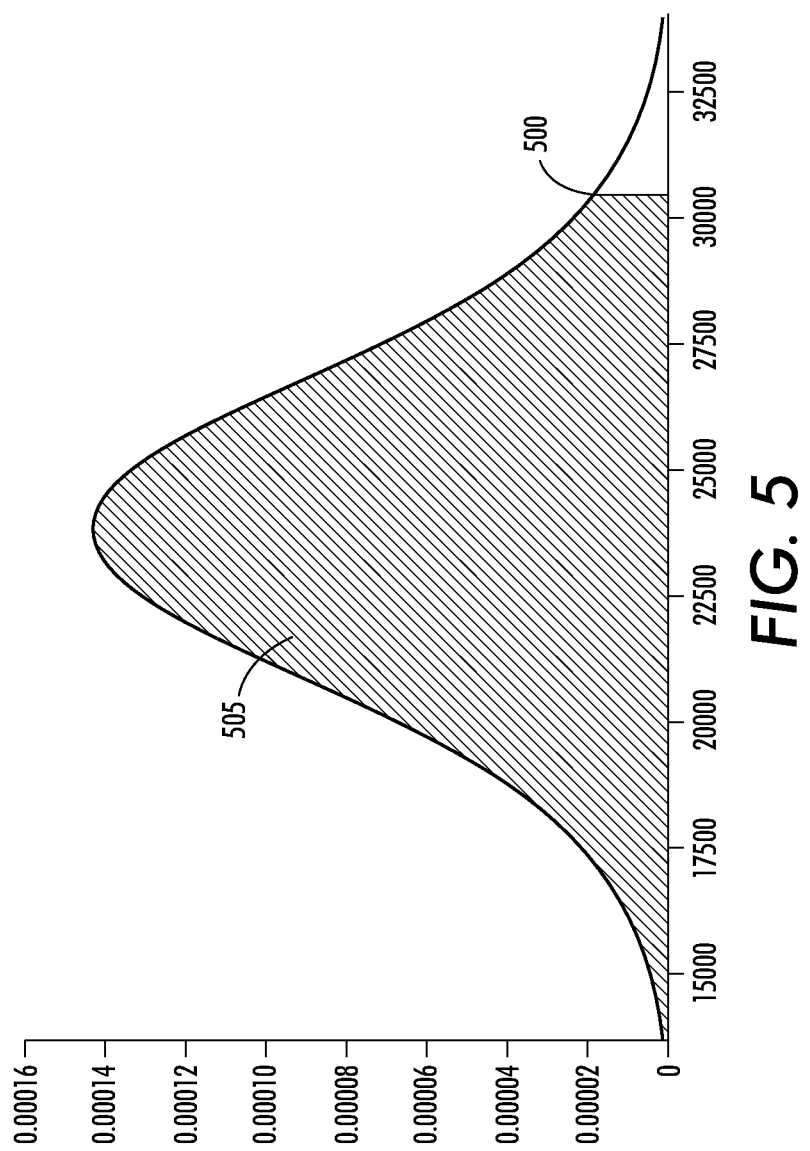

As another example, if the print shop is on schedule, and the actual start time of Print Job 3 is 18603 seconds, the remaining amount of time is equal to 30,984 seconds. The completion probability may be the area under the curve below 30,984 seconds, as illustrated in FIG. 5. In an embodiment, this area may be equal to 0.9971. The total area under the normal distribution may be equal to 1, so the ratio may be $$\frac{0.9971}{1}.$$

In an embodiment, this may mean that there is an 99.71% probability that the print shop will complete processing Print Jobs 1-5 before the end of the time period if Print Job 3 begins 18,603 seconds into processing the set.

In an embodiment, a lateness probability may be determined 270. In an embodiment, a lateness probability may be the probability that a print shop will not complete processing a set of print jobs within a time period. In an embodiment, a lateness probability may be determined 270 by subtracting a completeness probability associated with a print shop from 1.

In an embodiment, a completion probability and/or a lateness probability associated with a print shop being ahead of schedule one or more print jobs, behind schedule one or more print jobs, or on schedule at the start of the print job may be determined for one or more print jobs in a set. For example, if a set of print jobs includes four print jobs, a lateness probability may be determined for each print job if the print shop is zero, one, two, three or four print jobs ahead of schedule or behind schedule.

Table 2 illustrates exemplary lateness probabilities for 100 print jobs according to an embodiment. As illustrated by Table 2, the lateness probabilities correspond to whether the print shop is on schedule, one to nine print jobs ahead of schedule or one to nine print jobs behind schedule. Table 2 also shows the lateness probabilities at the start of print job 20, 30, 40, 50, 60, 70, 80 and 90.

TABLE 2

| Ahead (+) of Schedule | Start of job 20 | Start of job 30 | Start of job 40 | Start of job 50 | Start of job 60 | Start of job 70 | Start of job 80 | Start of job 90 |
|---|---|---|---|---|---|---|---|---|
| −9 | 76% | 77% | 98% | 100% | 100% | 100% | 100% | 100% |
| −8 | 55% | 62% | 94% | 98% | 100% | 100% | 100% | 100% |
| −7 | 30% | 46% | 79% | 89% | 99% | 100% | 100% | 100% |
| −6 | 17% | 27% | 57% | 75% | 94% | 99% | 100% | 100% |
| −5 | 8% | 12% | 37% | 54% | 77% | 92% | 100% | 100% |
| −4 | 2% | 6% | 13% | 24% | 53% | 78% | 99% | 100% |
| −3 | 1% | 1% | 3% | 11% | 31% | 54% | 86% | 100% |
| −2 | 0% | 0% | 1% | 3% | 10% | 19% | 43% | 94% |
| −1 | 0% | 0% | 0% | 0% | 1% | 4% | 10% | 35% |
| 0, On Schedule | 0% | 0% | 0% | 0% | 0% | 0% | 0% | 0% |
| 1 | 0% | 0% | 0% | 0% | 0% | 0% | 0% | 0% |
| 2 | 0% | 0% | 0% | 0% | 0% | 0% | 0% | 0% |
| 3 | 0% | 0% | 0% | 0% | 0% | 0% | 0% | 0% |
| 4 | 0% | 0% | 0% | 0% | 0% | 0% | 0% | 0% |
| 5 | 0% | 0% | 0% | 0% | 0% | 0% | 0% | 0% |
| 6 | 0% | 0% | 0% | 0% | 0% | 0% | 0% | 0% |
| 7 | 0% | 0% | 0% | 0% | 0% | 0% | 0% | 0% |
| 8 | 0% | 0% | 0% | 0% | 0% | 0% | 0% | 0% |
| 9 | 0% | 0% | 0% | 0% | 0% | 0% | 0% | 0% |

As illustrated by Table 2, if a print shop is nine print jobs behind schedule at the start of Print Job 20, it is 76% likely that the print shop will not complete processing of the 100 print jobs within a time period. This probability estimate increases to 100% if the print shop is still nine print jobs behind schedule at the start of Print Job 50. On the other hand, if the print shop is two print jobs behind schedule at the start of Print Job 50, there is only a 3% probability that the print shop will not complete processing of the 100 print jobs within a time period.

Figure 6:
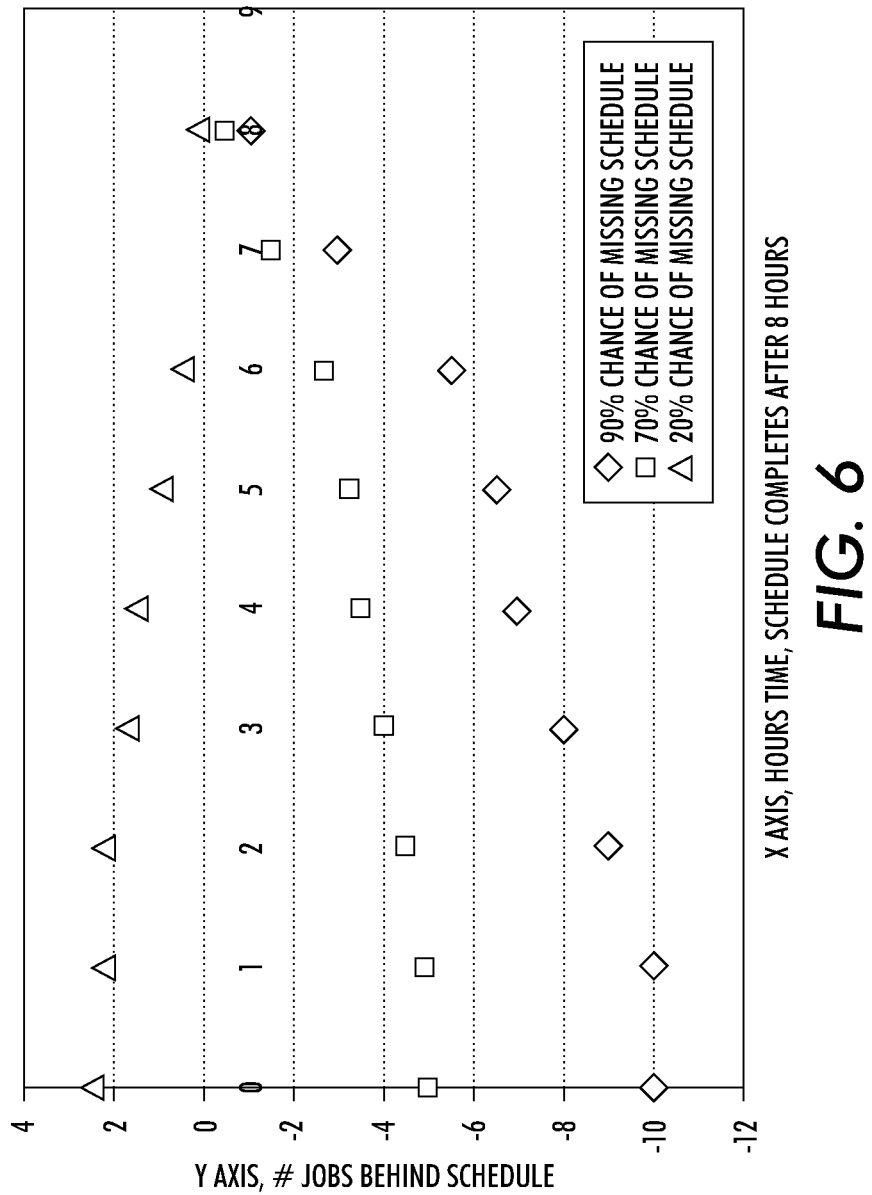
FIG. 6 illustrates an exemplary graphical depiction of lateness probabilities associated with a print shop according to an embodiment.

In an embodiment, completion probabilities, lateness probabilities and/or the like may be visually displayed 275. For example, lateness probabilities may be displayed to a print shop operator to allow the operator to monitor the progress of the print shop. In an embodiment, the probabilities may be displayed as a chart, a graph and/or other visual depictions. For example, FIG. 6 illustrates an exemplary graphical depiction of lateness probabilities associated with a print shop according to an embodiment. As illustrated by FIG. 6, the y-axis of the graph may represent the number of jobs a print shop is ahead of or behind of schedule. The x-axis may represent a number of hours in a time period. As illustrated by FIG. 6, different probabilities may be represented by different markings on the graph. For example, a lateness probability of 90% may be represented by a diamond shape, while a lateness probability of 70% may be represented by a square, and a lateness probability of 20% may be represented by a triangle. Additional and/or alternate lateness probabilities and/or markings may be used within the scope of this disclosure.

For example, referring to FIG. 6, if the print shop is four print jobs behind schedule at hour 4, there is a 70% probability that the print shop will not complete processing of the print jobs within a time period. If the print shop is eight print jobs behind schedule at hour 3, there is a 90% probability that the print shop will not complete processing of the print jobs within a time period.

In an embodiment, a user may be notified 280 if a print shop is predicted to fall behind schedule by a certain percentage and/or the like. For example, a user may be notified 280 by a message displayed on a display device, an email, an audible sound, a flashing light and/or other type of notification if the print shop is predicted to fall behind schedule by a certain percentage and/or the like. For instance, a message may be displayed on a print shop operator's computer screen if a lateness probability associated with a set of print jobs is greater than 30%. Additional and/or alternate notification methods and percentages may be used within the scope of this disclosure.

In an embodiment, a user may make a decision regarding operation of the print shop based on a visual display of lateness and/or completion probabilities. For example, print shop operator may schedule overtime, reallocate resources or outsource a portion of the print jobs if the print shop falls behind schedule.

Figure 7:
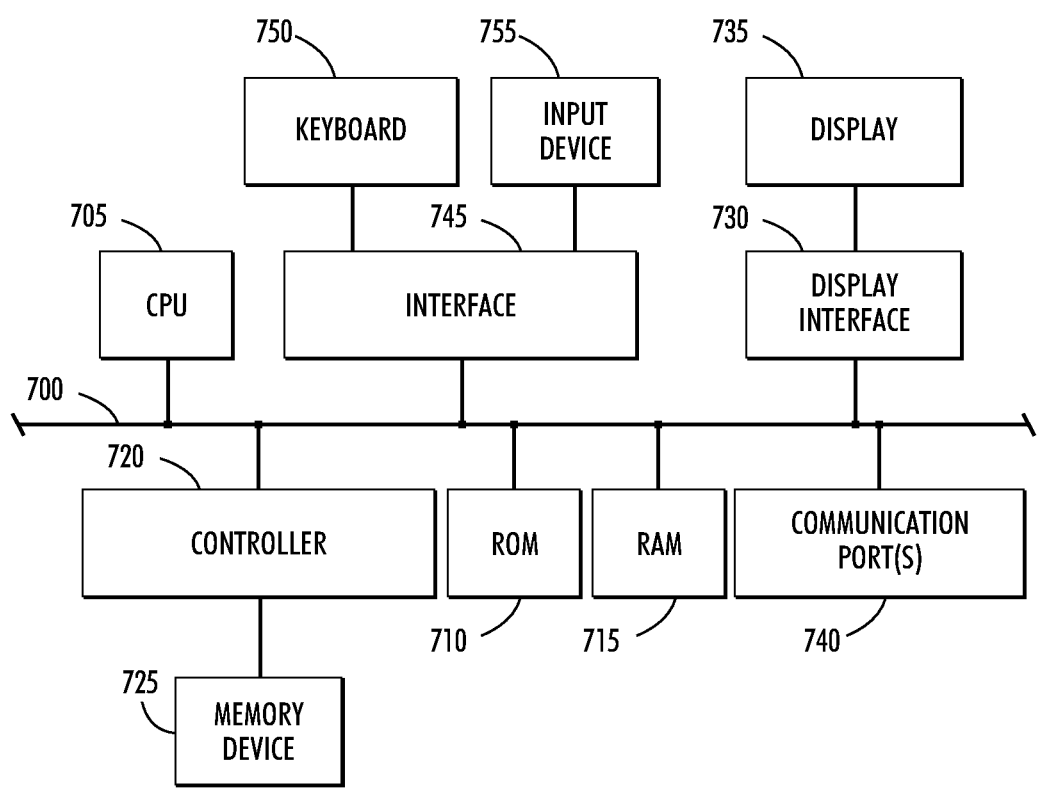
FIG. 7 depicts a block diagram of exemplary internal hardware according to an embodiment.

FIG. 7 depicts a block diagram of exemplary internal hardware that may be used to contain or implement program instructions, such as the process steps discussed above in reference to FIG. 2, according to embodiments. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an exemplary processing device, computing device or processor as such terms are used within this disclosure. Read only memory (ROM) 710 and random access memory (RAM) 715 constitute exemplary memory devices or processor-readable storage media.

A controller 720 interfaces with one or more optional memory devices 725 to the system bus 700. These memory devices 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 730 may permit information from the bus 700 to be displayed on the display 735 in audio, visual, graphic or alphanumeric format. Communication with external devices, such as a printing device, may occur using various communication ports 740. An exemplary communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

Variations of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of determining a probability of a set of print jobs being completed within a time period, the method comprising:
    receiving, by a computing device, a schedule associated with a set of print jobs, wherein the schedule comprises:
        a sequence in which the set of print jobs is to be processed,
        a mean processing time associated with each print job in the set, and
        a standard deviation of a processing time associated with each print job in the set;
    determining, by the computing device, a probability that one or more print devices in a print shop will complete processing of the set of print jobs within a time period based on the mean processing time and standard deviation associated with each of the print jobs in the set that has not been processed; and
    displaying the probability on a display device.

2. The method of claim 1, wherein determining a probability comprises:
    identifying a print job in the set of print jobs, wherein the identified print job is a first print job in the sequence that has not been processed;
    determining a remaining amount of time period in the time period;
    determining a total remaining mean processing time associated with the print jobs in the set that have not been processed;

determining a remaining standard deviation associated with the print jobs in the set that have not been processed; and identifying as the probability a ratio of an area under a normal distribution below a point equal to the remaining amount of time to a total area under the normal distribution, wherein the normal distribution has a mean equal to the total remaining mean processing time and a standard deviation equal to the remaining standard deviation.

3. The method of claim 2, wherein determining a remaining amount of time comprises determining a difference between the time period and an actual start time associated with the identified print job.

4. The method of claim 2, wherein determining a total remaining mean processing time comprises summing the mean processing times associated with each of the print jobs that have not been processed.

5. The method of claim 2, wherein determining a remaining standard deviation comprises:
   summing variances associated with each of the print jobs that have not been processed; and
   determining a square root of the sum.

6. The method of claim 1, further comprising determining the time period by summing the mean processing times associated with each print job in the set.

7. The method of claim 1, further comprising determining the time period by:
   determining a mean processing time sum by summing the mean processing times associated with each print job in the set;
   determining a variance sum by summing variances associated with each print job in the set;
   determining a total standard deviation by determining a square root of the variance sum; and
   adding a number of standard deviations to the mean processing time sum.

8. A method of determining a probability of a set of print jobs being completed within a shift period, the method comprising:
   receiving, by a computing device, a schedule associated with a set of print jobs, wherein the schedule comprises:
      a sequence in which the set of print jobs is to be processed,
      a mean processing time associated with each print job in the set, and
      a standard deviation of a processing time associated with each print job in the set;
   determining, by the computing device, a first probability that one or more print devices in a print shop will complete processing the set of print jobs within a time period if the print shop is a first number of print jobs behind schedule at a start time of the print job;
   determining, by the computing device, a second probability that one or more print devices in the print shop will complete processing the set of print jobs within the time period if the print shop is a second number of print jobs ahead of schedule at the start time of the print job;
   determining, by the computing device, a third probability that one or more print devices in the print shop will complete processing the set of print jobs within the time period if the print shop is on schedule at the start time of the print job; and
   displaying the first, second and third probabilities associated with each of the one or more print jobs on a display device.

9. The method of claim 8, wherein determining a first probability comprises:

determining a remaining amount of time in the time period;
determining a total remaining mean processing time associated with the print jobs that are processed after the print job in the sequence;
determining a remaining standard deviation associated with the print jobs that are processed after the print job in the sequence; and
identifying as the first probability a ratio of an area under a normal distribution below a point equal to the remaining amount of time to a total area under the normal distribution, wherein the normal distribution has a mean equal to the total remaining mean processing time and a standard deviation equal to the remaining standard deviation.

10. The method of claim 9, wherein determining a remaining amount of time comprises determining a difference between the time period and the start time associated with the print job.

11. The method of claim 9, wherein determining a total remaining mean processing time comprises summing the mean processing times associated with each of the print jobs that are processed after the print job in the sequence.

12. The method of claim 9, wherein determining a remaining standard deviation comprises:
   summing the variances associated with each of the print jobs that are processed after the print job in the sequence; and
   determining a square root of the sum.

13. The method of claim 8, wherein determining a second probability comprises:
   determining a remaining amount of time in the time period;
   determining a total remaining mean processing time associated with the print jobs that are processed after the print job in the sequence;
   determining a remaining standard deviation associated with the print jobs that are processed after the print job in the sequence; and
   identifying as the second probability a ratio of an area under a normal distribution below a point equal to the remaining amount of time to a total area under the normal distribution, wherein the normal distribution has a mean equal to the total remaining mean processing time and a standard deviation equal to the remaining standard deviation.

14. The method of claim 8, wherein determining a third probability comprises:
   determining a remaining amount of time in the time period;
   determining a total remaining mean processing time associated with the print jobs that are processed after the print job in the sequence;
   determining a remaining standard deviation associated with the print jobs that are processed after the print job in the sequence; and
   identifying as the third probability a ratio of an area under a normal distribution below a point equal to the remaining amount of time to a total area under the normal distribution, wherein the normal distribution has a mean equal to the total remaining mean processing time and a standard deviation equal to the remaining standard deviation.

15. A system of determining a probability of a set of print jobs being completed within a time period, the system comprising:
   a computing device; and
   a computer readable storage medium in communication with the computing device, wherein the computer-readable storage medium comprises one or more programming instructions for:

receiving a schedule associated with a set of print jobs, wherein the schedule comprises:
- a sequence in which the set of print jobs is to be processed,
- a mean processing time associated with each print job in the set, and
- a standard deviation of a processing time associated with each print job in the set, and determining a probability that a print shop will complete processing of the set of print jobs within a time period based on the mean processing time and standard deviation associated with each of the print jobs in the set that has not been processed, and causing the probability to be displayed on a display device.

16. The system of claim 15, wherein the one or more programming instructions for determining a probability comprise one or more programming instructions for:
- identifying a print job in the set of print jobs, wherein the identified print job is a first print job in the sequence that has not been processed;
- determining a remaining amount of time in the time period;
- determining a total remaining mean processing time associated with the print jobs in the set that have not been processed;
- determining a remaining standard deviation associated with the print jobs in the set that have not been processed; and
- identifying as the probability a ratio of an area under a normal distribution below a point equal to the remaining amount of time to a total area under the normal distribution, wherein the normal distribution has a mean equal to the total remaining mean processing time and a standard deviation equal to the remaining standard deviation.

17. The system of claim 16, wherein the one or more programming instructions for determining a remaining amount of time comprise one or more programming instructions for determining a difference between the time period and a start time associated with the identified print job.

18. The system of claim 16, wherein the one or more programming instructions for determining a total remaining mean processing time comprise one or more programming instructions for summing the mean processing times associated with each of the print jobs that have not been processed.

19. The system of claim 16, wherein the one or more programming instructions for determining a remaining standard deviation comprise one or more programming instructions for:
- summing the variances associated with each of the print jobs that have not been processed; and
- determining a square root of the sum.

20. The system of claim 15, wherein the one or more programming instructions further comprise one or more programming instructions for determining the shift period by summing the mean processing times associated with each print job in the set.

21. The system of claim 15, wherein the one or more programming instructions further comprise one or more programming instructions for determining the time period by:
- determining a mean processing time sum by summing the mean processing times associated with each print job in the set;
- determining a variance sum by summing the variances associated with each print job in the set;
- determining a total standard deviation by determining a square root of the variance sum; and
- adding a number of total standard deviations to the mean processing time sum.

* * * * *